March 5, 1935.  A. D. CARPENTER ET AL  1,993,591
TRAILER CONNECTION
Original Filed May 15, 1933
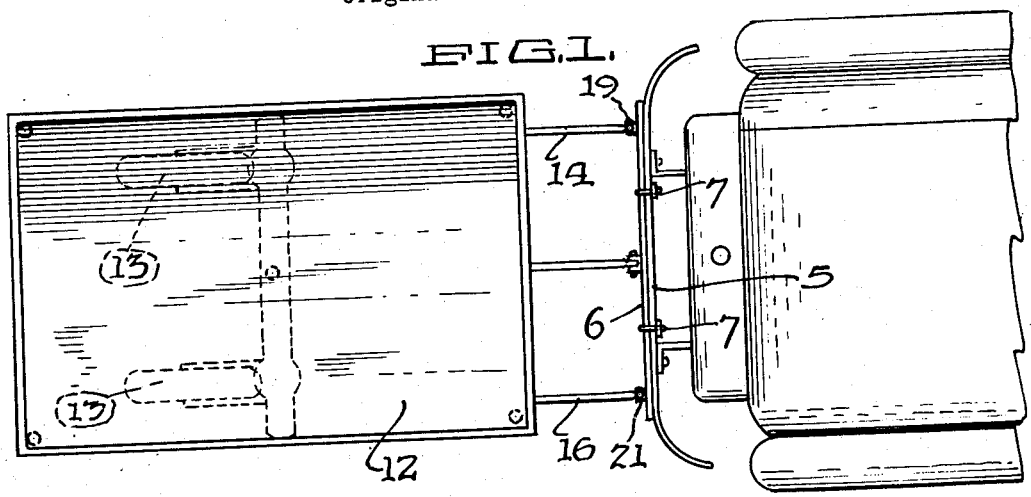
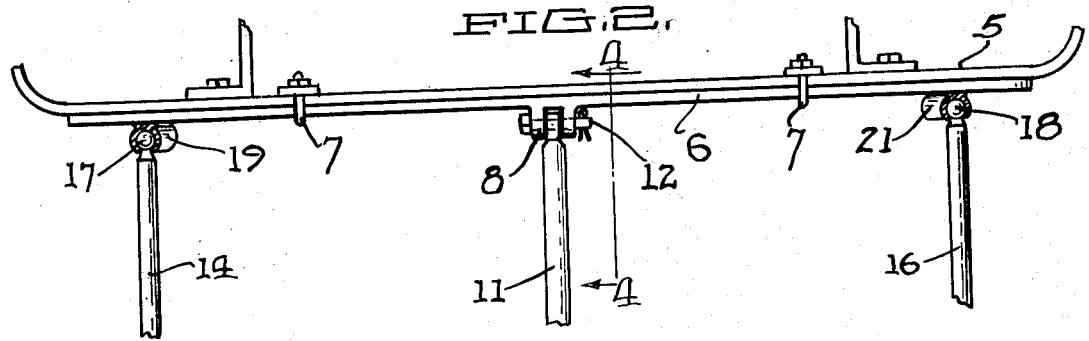
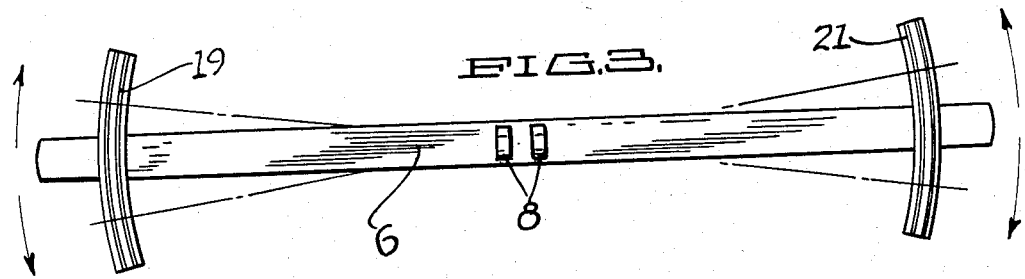
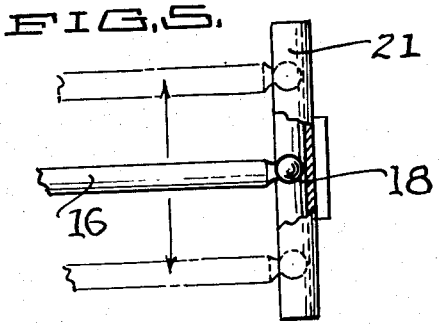
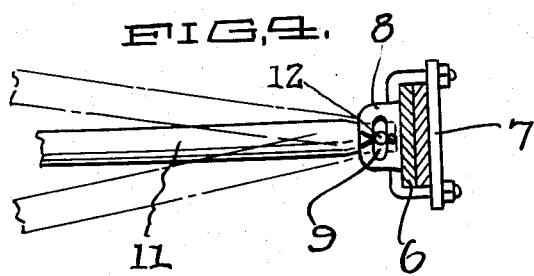
INVENTORS:
ARLEY D. CARPENTER
J. L. THACH.
BY Victor J. Evans & Co
ATTORNEYS.

Patented Mar. 5, 1935

1,993,591

UNITED STATES PATENT OFFICE 1,993,591

TRAILER CONNECTION

Arley D. Carpenter and John L. Thach, Los Angeles, Calif., assignors of one-fourth to Albert Wecker, Los Angeles, Calif.

Application May 15, 1933, Serial No. 671,256
Renewed August 2, 1934

2 Claims. (Cl. 280—33.44)

This invention relates to improvements in trailer connections.

The principal object is to provide means for connecting a trailer to a motor vehicle, whereby the horizontal plane of said vehicle and said trailer may accommodate themselves to various road conditions.

A further object is to produce a device which will permit backing of the trailer in such a manner that the body of the trailer will remain parallel with the body of the motor vehicle.

A still further object is to produce a device which is economical to manufacture.

Other objects and advantages will be apparent during the course of the following description.

In the accompanying drawing forming a part of this specification and in which like numerals are employed to designate like parts throughout the same, Fig. 1 is a top plan view of our device as the same would appear when connected to a motor vehicle, Fig. 2 is an enlarged fragmentary detail view of our connection, Fig. 3 is a rear elevation of the connecting bar, Fig. 4 is a cross section on the line 4—4 of Fig. 2, and Fig. 5 is a fragmentary detail view illustrating the manner in which the end of the yoke travels in its guide.

Trailers are used in order to increase the capacity of a motor vehicle to transport additional load. These trailers are usually connected to the vehicle by a single pivotal connection and as a result it is difficult to back, side-sway often occurs which results in a wiping action liable to cause serious accidents, and applicants have therefore, devised a trailer wherein these disadvantages are overcome.

In the accompanying drawing wherein for the purpose of illustration is shown a preferred embodiment of our invention, the numeral 5 designates the rear bumper of a motor vehicle and the numeral 6 a bar attached thereto through the medium of clamps 7. This bar 6 has a clevis 8 formed in the center thereof, which clevis has an elongated opening 9. A pull rod 11 is secured within the clevis and has a pin 12 which extends through an eye formed in the end of the rod and through the openings 9. This construction permits up and down movement of the pull rod, as illustrated in Fig. 4, and due to the elongated slots 9, the rod 11 may also rotate about its axis to a limited extent. At 12 we have shown the body of a trailer which preferably has castor wheels 13 supported therebelow. Attached to the body in any desired manner are guide rods 14 and 16, each of which is provided with a ball as shown at 17 and 18, which are carried in raceways 19 and 21, respectively.

The result of this construction is that when the trailer is connected to the rear of the vehicle as shown in Fig. 1, any inequalities in the road will be accommodated for through the fact that the trailer body may twist with relation to the vehicle body, as well as, rise and fall with the changes in elevation. The guide rods 14 and 16 merely act to keep the body of the trailer parallel with the body of the vehicle and their ball ends are free to travel in the guides as conditions demand.

It will thus be seen that with the device as here shown, the trailer will accurately perform any maneuvers which the driver chooses to execute.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a device of the character described, the combination with a motor vehicle having a rear bumper, of a bar connected thereto, said bar having a clevis formed midway of its length, arcuate-shaped guides spaced on opposite sides of said clevis, guide-rods movably secured in said guides and having their opposite ends connected to a trailer body, and a draw-bar connected to said clevis and to the trailer body.

2. In a device of the character described, the combination with a motor vehicle having a rear bumper, of a bar connected thereto, said bar having a clevis formed midway of its length, arcuate-shaped guides spaced on opposite sides of said clevis, guide-rods movably secured in said guides and having their opposite ends connected to a trailer body, a draw-bar connected to said clevis and to the trailer body, said clevis having elongated openings formed therein, and said drawbar having a pin extending through said openings whereby a limited universal movement is permitted.

ARLEY D. CARPENTER.
JOHN L. THACH.